United States Patent [19]
Miyamoto et al.

[11] Patent Number: 6,011,320
[45] Date of Patent: Jan. 4, 2000

[54] VEHICLE ANTI-THEFT DEVICE USING BOTH ELECTROMAGNETIC INDUCTION AND FREQUENCY MODULATION TRANSMISSION OF POWER AND DATA

[75] Inventors: Hiroshi Miyamoto; Yasuhiro Miyazawa, both of Shizuoka, Japan

[73] Assignee: Yazaki Corporation, Tokyo, Japan

[21] Appl. No.: 09/046,599

[22] Filed: Mar. 24, 1998

[30]      Foreign Application Priority Data

Mar. 25, 1997   [JP]   Japan ..................................... 9-071843

[51] Int. Cl.[7] ................................................. B60R 25/00
[52] U.S. Cl. .......................... 307/10.2; 307/104; 180/287
[58] Field of Search ........................ 307/104, 10.1–10.6;
           180/287, 289; 336/DIG. 2, 20; 340/310.01–310.07,
                   825.69, 825.72, 825.3–825.32, 825.44,
                   825.34, 825.54, 539, 425.5, 426; 235/382,
                   382.5, 384; 439/950; 343/856, 788; 455/41

[56]              References Cited

U.S. PATENT DOCUMENTS 5,473,200  12/1995  Woo ....................................... 307/10.2
5,644,172   7/1997  Hodges .................................. 307/10.5
5,686,765  11/1997  Washington ........................... 307/10.5
5,804,888   9/1998  Murr et al. .............................. 307/10.2
5,874,785   2/1999  Liu ......................................... 307/10.5

FOREIGN PATENT DOCUMENTS

7-150835   6/1995   Japan .

*Primary Examiner*—Richard T. Elms
*Attorney, Agent, or Firm*—Sughrue, Mion, Zinn, Macpeak & Seas, PLLC

[57]            ABSTRACT

A key entry system having redundant communication between the IC card and the vehicle controller to ensure continuous operation. The ID card and the vehicle controller each includes a memory for storing an ID code, an electromagnetic induction power supply/transmission circuit for transmitting and receiving the ID code and an RF modem also for transmitting and receiving the ID codes. Thus, in the event that communication cannot be made between the RF modems, the key entry system will still function by communication between the electromagnetic induction power supply/transmission circuits.

4 Claims, 7 Drawing Sheets

VEHICLE ANTI-THEFT DEVICE USING BOTH ELECTROMAGNETIC INDUCTION AND FREQUENCY MODULATION TRANSMISSION OF POWER AND DATA

BACKGROUND OF THE INVENTION

The present invention relates to a key entry system which permits locking or unlocking of the door of a vehicle, unlocking of a steering lock, starting of an engine, and the like.

Figure 9:
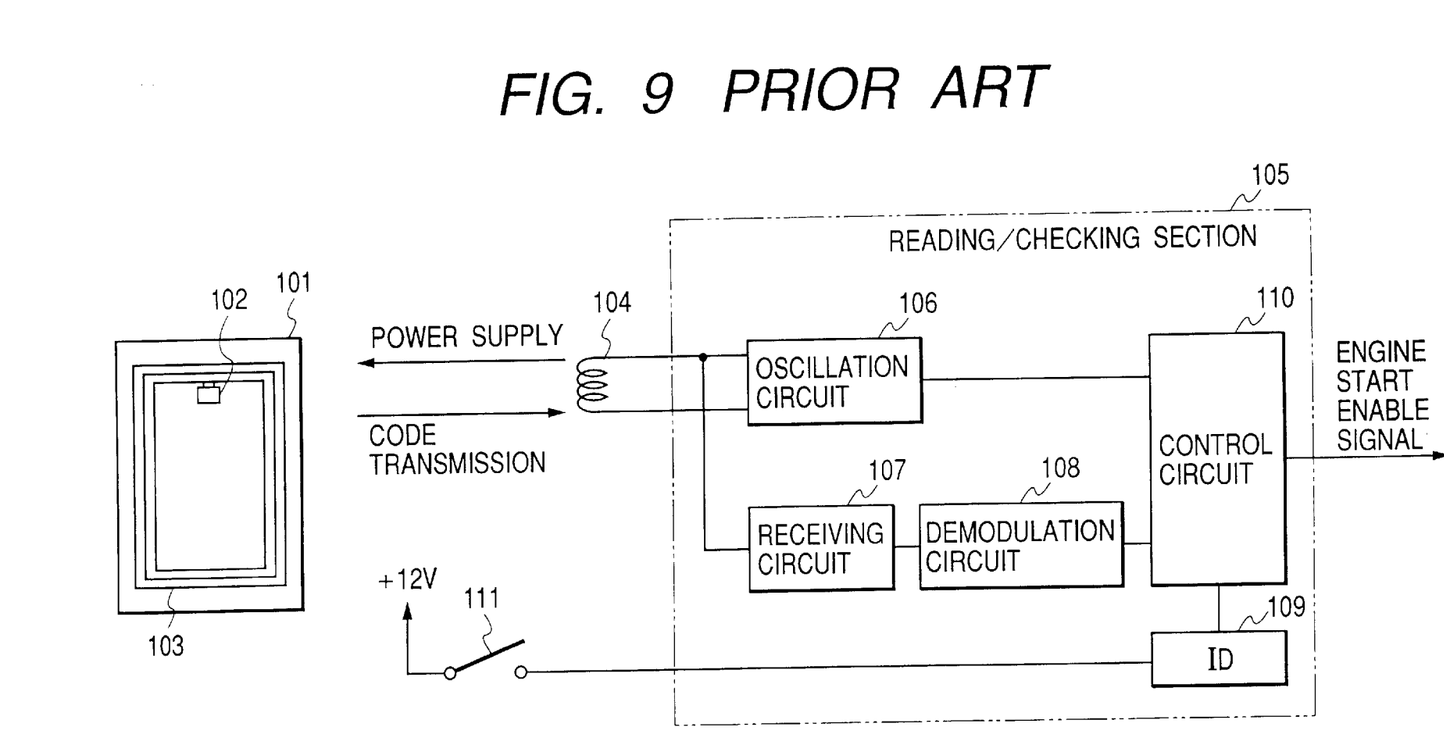
FIG. 9 is a block diagram showing the configuration of a conventional operation management system.

Such an "operation management system" as is disclosed in, e.g., Japanese Patent Application Unexamined Publication No. Hei. 7-150835 has already been known as an apparatus which locks or unlocks the door of a vehicle or starting of an engine in a non-contact manner without use of a mechanical key. FIG. 9 shows the configuration of the operation management system.

As shown in the drawing, the "operation management system" comprises a driver's license card 101 and a reading/checking section 105. The driver's license card 101 includes: an IC circuit 102 which is constituted by an ID memory for storing identifying data for identification purposes, a control section for controlling reading and writing of contents of the ID memory, a modulation circuit, a transmission circuit, and a rectifier supply circuit (any parts are not shown); and an antenna coil 103. The reading/checking section 105 is provided on the vehicle and is connected to an antenna 104. This reading/checking section 105 comprises an oscillation circuit 106 for transmitting data via the antenna 104, a receiving circuit 107 for receiving data via the antenna 104, a demodulator circuit 108 for demodulating a received signal, an ID memory 109, and a control circuit 110 which controls the reading and writing of contents of the ID memory 109. Upon receipt of an operation instruction from an ignition/push switch 111, the reading/checking section 105 is activated to send power to the driver's license card 101 by radio transmission, as well as to make a decision, on the basis of a return code signal received from the driver's license card 101, as to whether or not the driver is authorized to drive the vehicle.

In this case, when the driver's license card 101 is brought close to the antenna 104 provided in the vehicle, electromagnetic induction arises between the antenna coil 103 incorporated in the card and the antenna 104, so that power is supplied to the driver's license card. Further, code data are exchanged between the driver's license card and the reading/checking section, thereby enabling locking or unlocking of the door and the starting of an engine in a non-contact manner without using a mechanical key.

However, the foregoing existing "operation management system" suffers the following problem.

The communication range between the antenna coil 103 and the antenna 104 is considerably unsatisfactory in terms of the characteristics of the currently-used RKE (Remote Key Entry) function. Particularly, in a case where the antenna 104 is provided on the vehicle, a considerably amount of leakage magnetic flux arises, because the vehicle body is made of a magnetic substance. As a result, data communications can be carried out only within a short distance of 10 cm or less.

Since the driver's license card 101 must be brought in parallel with the antenna 104 provided on the vehicle, there is a limit to the angle at which the driver's license card 101 is held to the antenna 104, imposing an inconvenience on the user.

As mentioned above, in spite of the fact that the portability of the key is improved by forming the key in the form of a card, since transmission and receipt of data are carried out only through electromagnetic induction, the user cannot lock or unlock a door lock while holding the driver's license card 101 in a pocket or wallet.

SUMMARY OF THE INVENTION

In view of the foregoing drawback in the art, an object of the present invention is to provide a key entry system which can readily and accurately make control of locking and unlocking of a vehicle, and the like, irrespective of the state in which an IC card is held.

To accomplish the foregoing object, a key entry system including an IC card and a vehicle controller, wherein the IC card comprises a memory for storing an ID code and an electromagnetic induction power supply/transmission circuit which receives power supply and which transmits the ID code to or receives the ID code from the vehicle controller by means of electromagnetic induction occurring between the circuit and the vehicle controller, and wherein the vehicle controller comprises a memory storing an ID code, a code checking section which checks the ID code against the ID code received from the IC card, and an electromagnetic induction power supply/reception circuit which supplies power to the IC card and which transmits data to and receives data from the vehicle controller by means of electromagnetic induction, characterized in that:

RF (Radio Frequency) modems are provided, respectively, on the IC card and the vehicle controller, for transmitting and receiving data including the ID code through a radio signal.

With the foregoing configuration, since the locking or unlocking action of the door lock can be controlled by means of an FM signal via an FM-scheme modem, the door lock can be accurately controlled irrespective of the state in which the IC card is held. Further, since the transmission and receipt of data by the original electromagnetic induction can also be used, the reliability of the key entry system can also be improved.

DETAILED DESCRIPTION OF THE PREFERRED EMBODIMENTS

Figure 1:
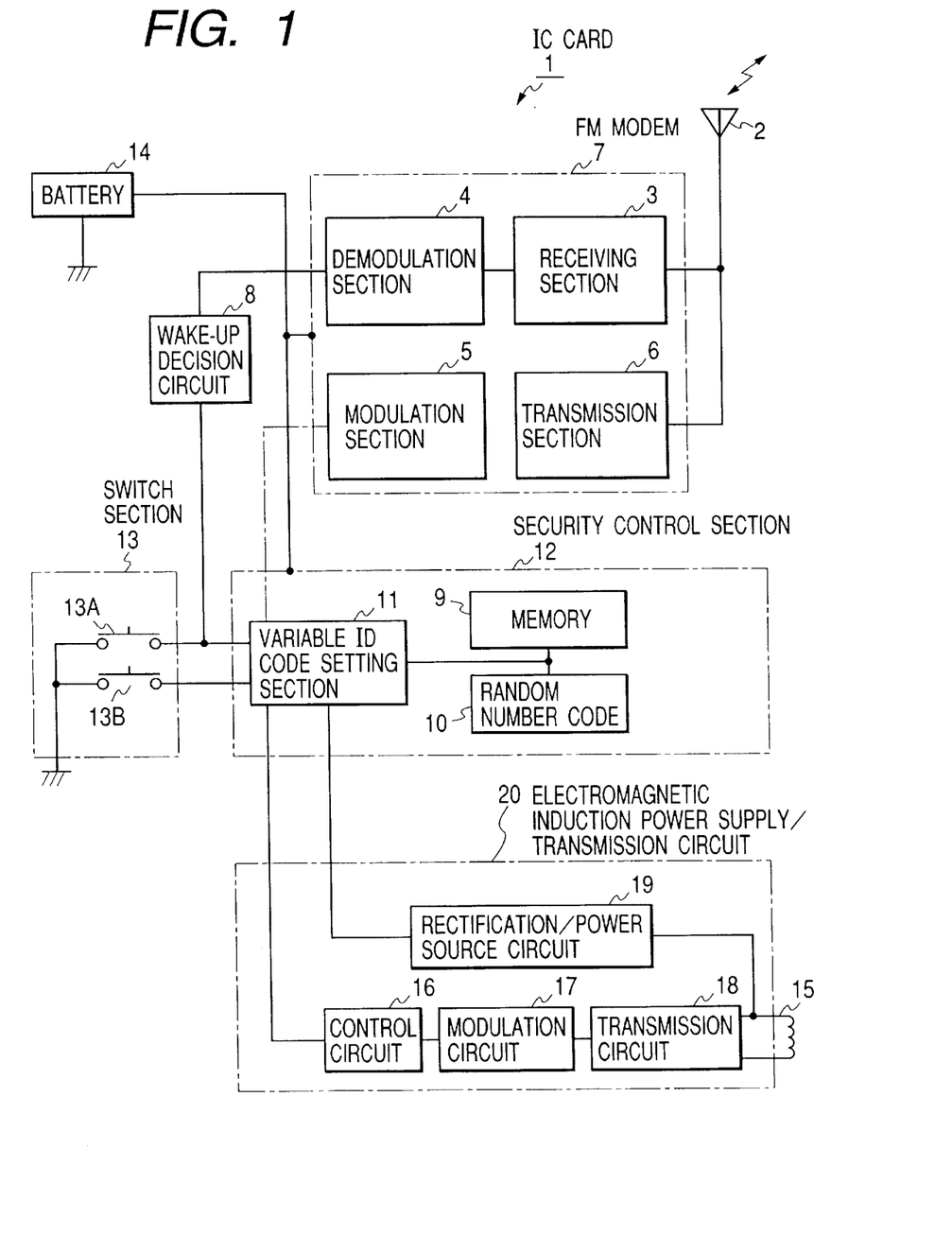
FIG. 1 is a block diagram showing the configuration of an IC card used for a key entry system according to the present invention.
Figure 2:
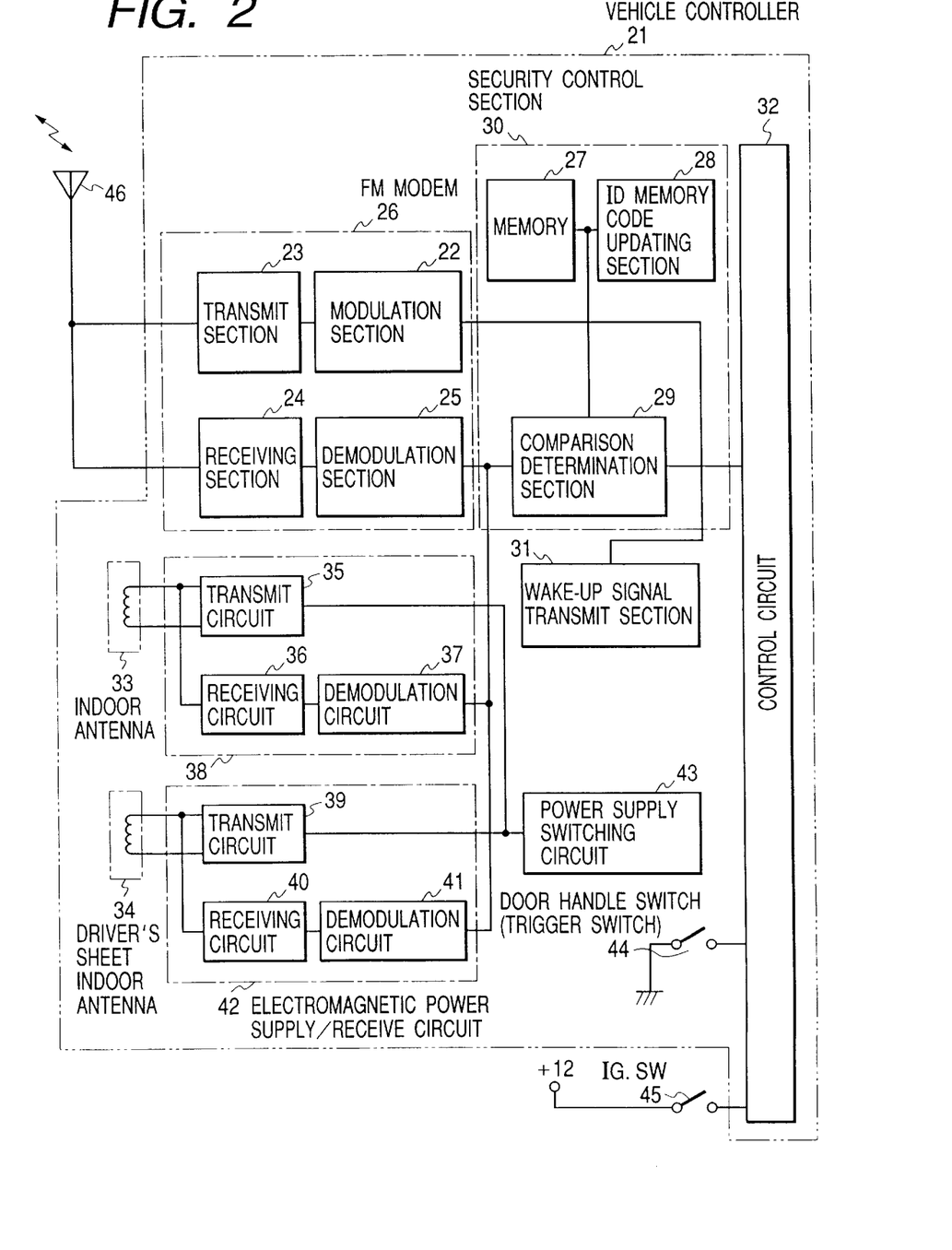
FIG. 2 is a block diagram showing the configuration of a vehicle controller used for the key entry system according to the present invention.

FIG. 1 is a block diagram showing the configuration of a vehicle IC card used for a key entry system according to the present invention, and FIG. 2 is a block diagram showing the configuration of a vehicle controller used for the key entry system.

First, the configuration of the vehicle IC card will be described. The IC card 1 comprises an antenna 2; an FM modem 7 including a receiving section 3, a demodulation section 4, a modulation section 5, and a transmission section 6; a wake-up decision circuit 8 which makes a decision as to whether or not a wake-up signal received from the vehicle matches the IC card; a security control section 12 including a memory 9 for storing an ID code, a random number code section 10 for generating random numbers used for setting a new ID code, and a variable ID code setting section 11 for setting a new ID code on the basis of random numbers generated by the random number code section 10 and for storing the thus-set new ID code; a switch section 13 including a lock switch 13A and an unlock switch 13B used for an active entry operation which will be described later; and a battery 14 which supplies d.c. power to the individual sections of the IC card.

The IC card 1 further comprises an electromagnetic induction power supply/transmission circuit 20 which includes a coil antenna 15, a control circuit 16 for reading and writing the ID data set by the security control section 12, a modulation circuit 17, a transmission circuit 18, and a rectification/power source circuit 19. Upon receipt of an a.c. voltage supplied from the vehicle as a result of electromagnetic induction, the electromagnetic induction power source/transmission circuit 20 sends the ID code using the a.c. voltage as power.

Figure 3:
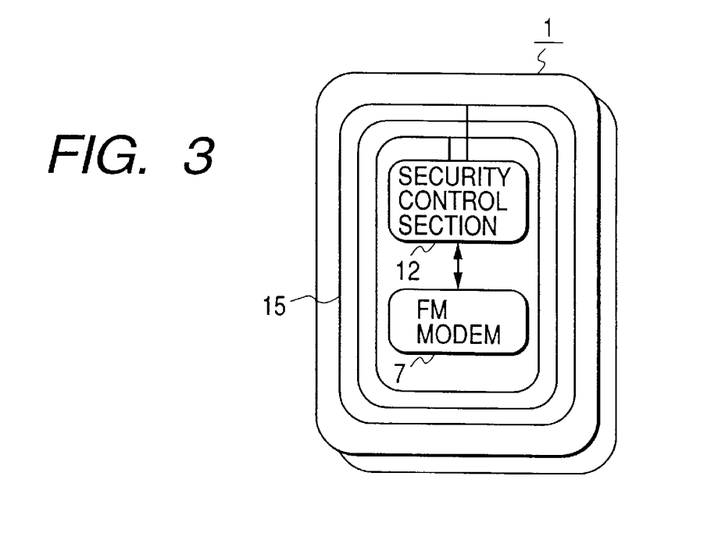
FIG. 3 is a structural view schematically showing the IC card shown in FIG. 1.

FIG. 3 schematically shows the configuration of the IC card 1. The coil antenna 15 is coiled around an outer frame of a card housing, and the security control section 12 is connected to the coil antenna 15. The FM modem 7 is connected to the security control section 12.

As shown in FIG. 2, the vehicle controller 2 comprises an FM modem 26 including a modulation section 22, a transmission section 23, a receiving section 24, and a demodulation section 25; a security control section 30 including a memory 27 for storing an ID code, an ID memory code updating section 28 which updates the contents of the memory 7 when receiving a new ID code from the IC card 1, and a comparison determination section 29 which compares the ID code received from the IC card 1 with the ID code stored in the memory 27 and decides, on the basis of the result of the comparison, whether or not there is a match between the ID codes; a wake-up signal transmission section 31 for transmitting a wake-up signal to the IC card 1; and a control circuit 32 which has a CPU and controls the overall vehicle controller.

The vehicle controller 21 further comprises an indoor antenna 33; a driver's seat indoor antenna 34; an electromagnetic induction power supply/reception circuit 38 which is provided on the door and includes a transmission circuit 35, a receiving circuit 36, and a demodulation circuit 37; a driver's seat electromagnetic induction power supply/reception circuit 42 including a transmission circuit 39, a receiving circuit 40, and a demodulation circuit 41; a power supply switching circuit 43; and a door handle switch (a trigger switch) 44 for generating a trigger signal. A control circuit 32 receives an ignition instruction from an ignition switch 45, and reference numeral 46 designates an audio antenna used for receiving and transmitting an FM signal.

Figure 4:
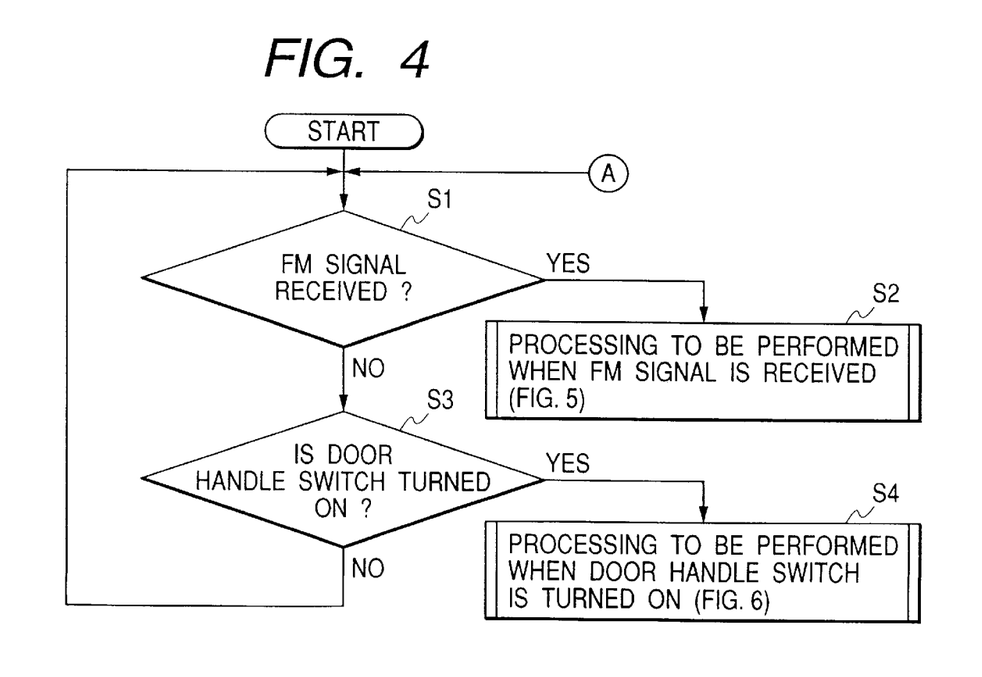
FIG. 4 is a flowchart showing the operation of the key entry system according to the present invention.
Figure 5:
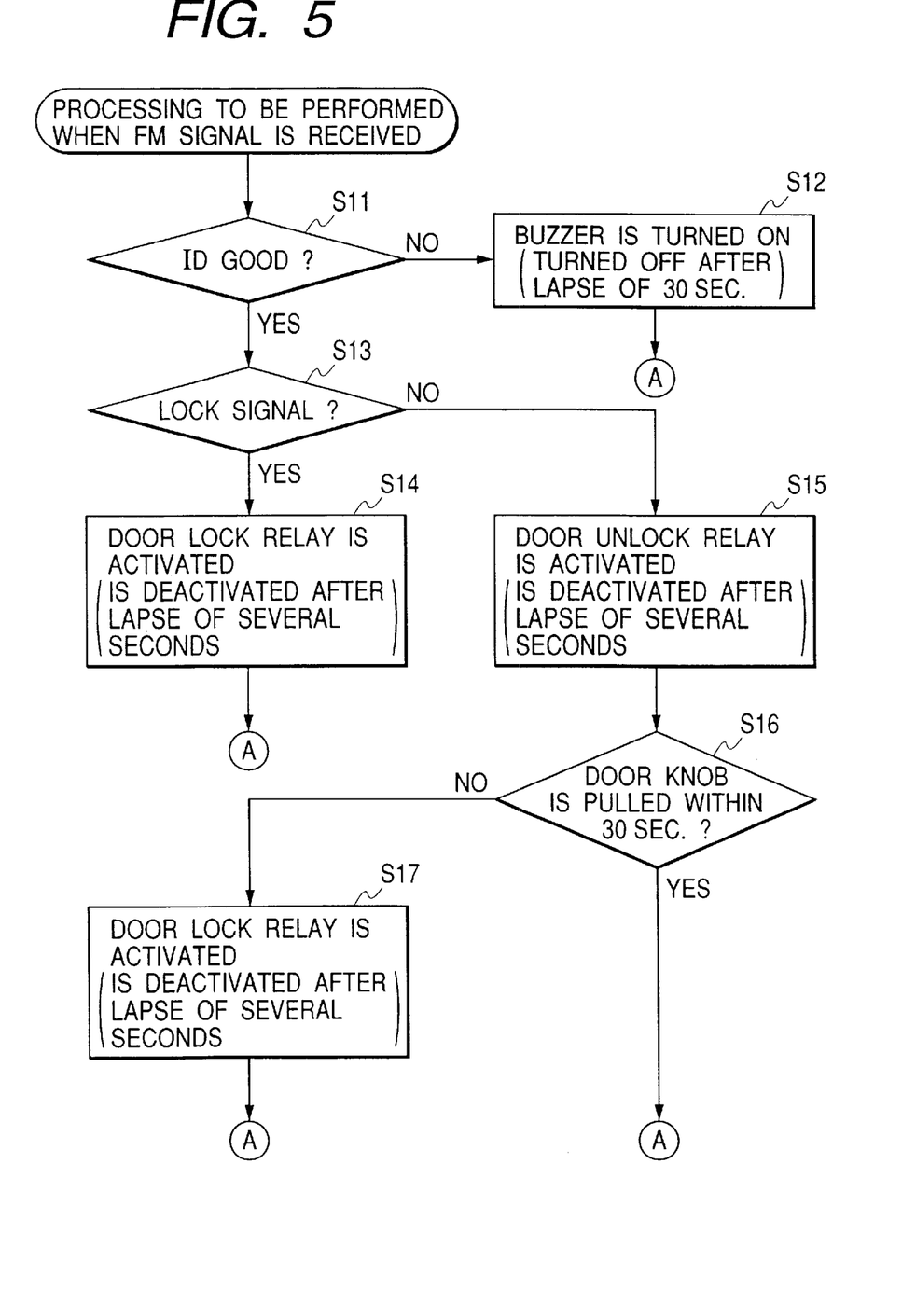
FIG. 5 is a flowchart showing the operation of the key entry system according to the present invention.
Figure 6:
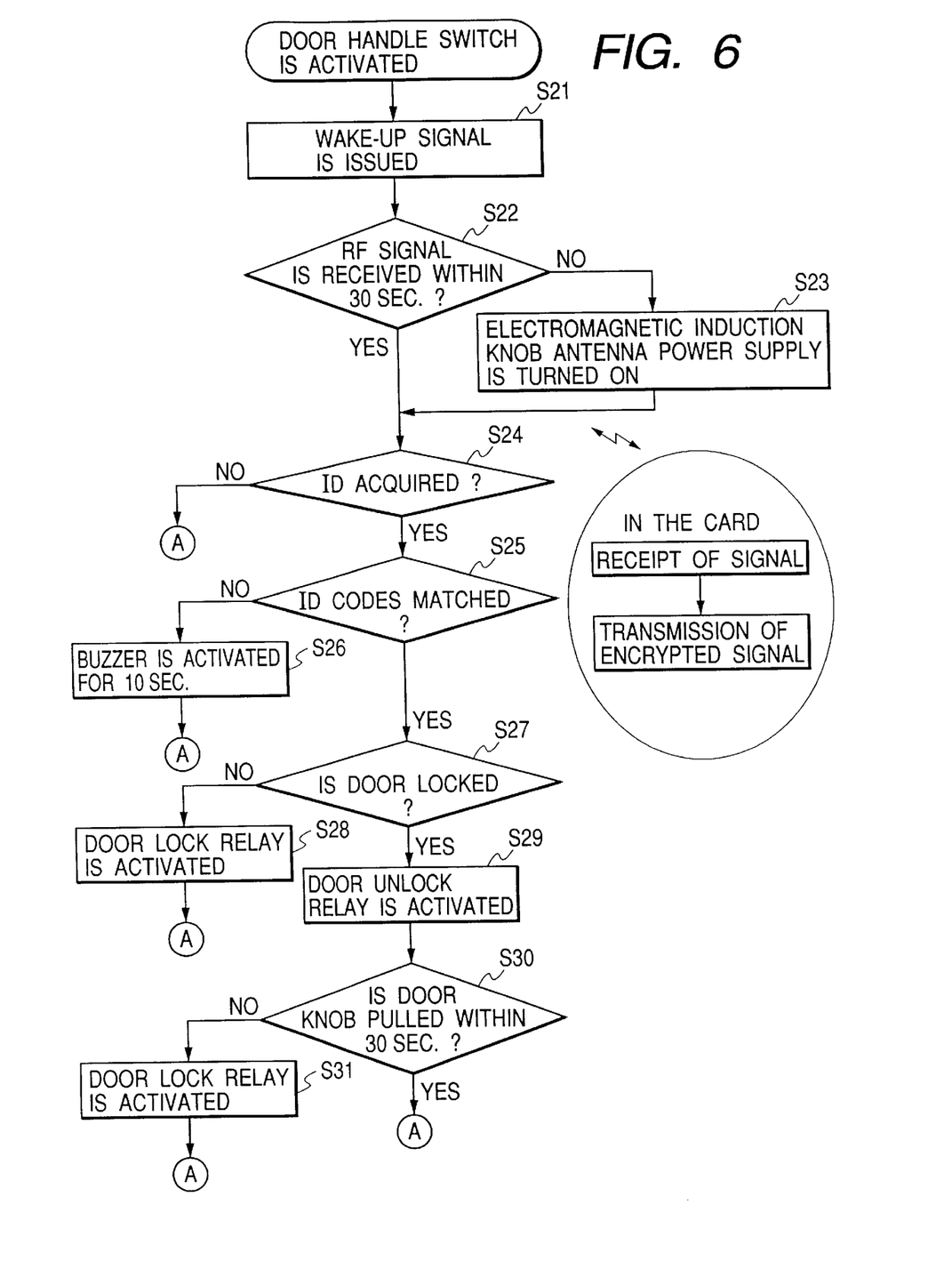
FIG. 6 is a flowchart showing the operation of the key entry system according to the present invention.

The operation of the key entry system according to the embodiment will be described with reference to flowcharts shown in FIGS. 4 through 6. The flowchart shown in FIG. 4 represents a signal wait operation performed by the vehicle controller, and the flowchart shown in FIG. 5 represents processing carried out by the vehicle controller when the vehicle controller receives an FM signal. The flowchart shown in FIG. 6 represents processing carried out when the door handle switch 44 is turned on to supply a trigger signal.

In the present embodiment, the user can perform two types of entry operations; that is, a passive entry operation in which the user can operate the vehicle while holding the IC card 1 in a breast pocket or the like, and an active entry operation in which the user locks or unlocks the door lock from a distant location using the lock switch 13A or the unlock switch 13B of the IC card 1.

The vehicle controller 21 monitors the reception of an FM signal or a trigger signal at all times. When receiving an FM signal, the vehicle controller 21 commences execution of the processing to be performed when the vehicle controller receives an FM signal (i.e., the active entry operation). In contrast, when the door handle switch 44 is turned on and the trigger signal is supplied to the control circuit 32, the vehicle controller commences execution of the processing to be performed when the vehicle controller receives a door handle signal (i.e., the passive entry operation) (steps S1 to S4).

First, the active entry operation will be described. When the holder of the IC card 1 actuates either the lock switch 13A or the unlock switch 13B of the IC card 1, an ID code generated by the security control section 12 is supplied to the FM modem 7 together with a lock or unlock signal. After having been FM-modulated, the ID code and the lock or unlock signal are transmitted in the form of an FM signal from the antenna 2.

When the FM modem 26 provided on the vehicle receives the FM signal by way of the audio antenna 46, as shown in FIG. 2, the comparison determination section 29 compares ID code data included in the received FM signal with the ID code data set on the vehicle controller beforehand. If there is no match between the ID code data sets, a buzzer is activated to sound an alarm that the IC card is invalid, because the IC card 1 is different from the valid IC card 1 of the user of this vehicle (steps S11, S12). The buzzer is deactivated after lapse of 30 seconds since it was turned on. In contrast, if there is a match between the ID code data sets, a decision is made as to whether or not the received signal is a lock signal or an unlock signal (step S13). If the received signal is a lock signal, the door lock relay is turned on, thus locking the door lock (step S14). The door lock relay is deactivated after lapse of a few seconds, and then step S1 is executed again. In contrast, if the received signal is an unlock signal, the door unlock relay is activated, thus unlocking the door lock (step S15). The door unlock relay is deactivated after lapse of a few seconds. When the door lock is unlocked, a decision is made as to whether or not a door knob is pulled (step S16). If a door knob is not pulled within 30 seconds, it is decided that the user has stopped riding in the vehicle, and hence the door lock relay is activated to lock the door lock again (step S17). The door lock relay is deactivated after lapse of a few seconds.

Next, the passive entry operation performed when the door handle switch 44 is turned on will be described with reference to FIG. 6.

When the door handle switch 44 is turned on, a trigger signal is supplied to the control circuit 32, where a wake-up signal generation instruction is output to the wake-up signal transmission section 31 in response to the trigger signal. The wake-up signal output from the wake-up signal transmission section 31 is transmitted to the IC card 1 in the form of an FM signal by way of the modulation section 22, the transmission section 23 of the FM modem 26, and the audio antenna 46 (step S21).

The signal that has been demodulated by the demodulation section 4 of the FM modem 7 of the IC card 1 is checked by the wake-up decision circuit 8 as to whether or not the wake-up signal is intrinsic to the IC card 1. If the wake-up signal is intrinsic to the IC card 1, the wake-up decision circuit 8 outputs an ID code transmission instruction to the security control section 12. In response to the ID code transmission instruction, the variable ID code setting section 11 of the security control section 12 sets a new ID code on the basis of the random numbers generated by the random number code section 10, and stores the thus-set new ID code into the memory 9. This new ID code is supplied to the FM modem 7, and the modulation section 5 of the FM modem 7 generates an FM signal including the ID code and transmits the thus-generated FM signal to the vehicle controller 21 by way of the transmission section 6 and the antenna 2.

If the vehicle controller 21 receives an RF signal (i.e., an FM signal) within three seconds after the FM signal has been transmitted, or if a knob antenna power supply is turned on as a result of electromagnetic induction, the ID code data included in the received signal is demodulated. The comparison determination section 29 compares the thus-demodulated ID code data with the code data registered in the vehicle controller. If there is no match between the ID code data sets, a buzzer is activated for about 10 seconds (step S26), and the signal wait processing is executed in step S1.

If a match between the ID code data sets is acknowledged, a decision is made as to the state of the door lock (step S27). If the door lock is in a released state, the door lock relay is activated to lock the door lock (step S28), and step S1 is executed. In contrast, if the door lock is in a locked state, the door unlock relay is activated to unlock the door lock (step S29). If a door knob is pulled within 30 seconds since the door lock was unlocked, it is decided that the user rides in the vehicle. Step S1 is again executed to start the signal wait processing. In contrast, if a door knob is not pulled within 30 seconds, it is decided that the user has stopped riding in the vehicle, and the door lock relay is again activated for the sake of safety, thus locking the door lock (S30, S31). Subsequently, first step S1 is again executed.

As mentioned above, the FM modems 7, 26 are provided for both the IC card 1 and the vehicle controller 21 to thereby lock or unlock the door lock by means of an FM signal. As a result, the locking or unlocking action of the door lock can be correctly controlled while the IC card 1 is held in a pocket or bag.

<Description of Unlocking of a Steering Lock, as well as of Starting of an Engine>

Next, an explanation will be given of the unlocking of a steering lock, as well as the starting of an engine, through use of the foregoing IC card 1.

Figure 7:
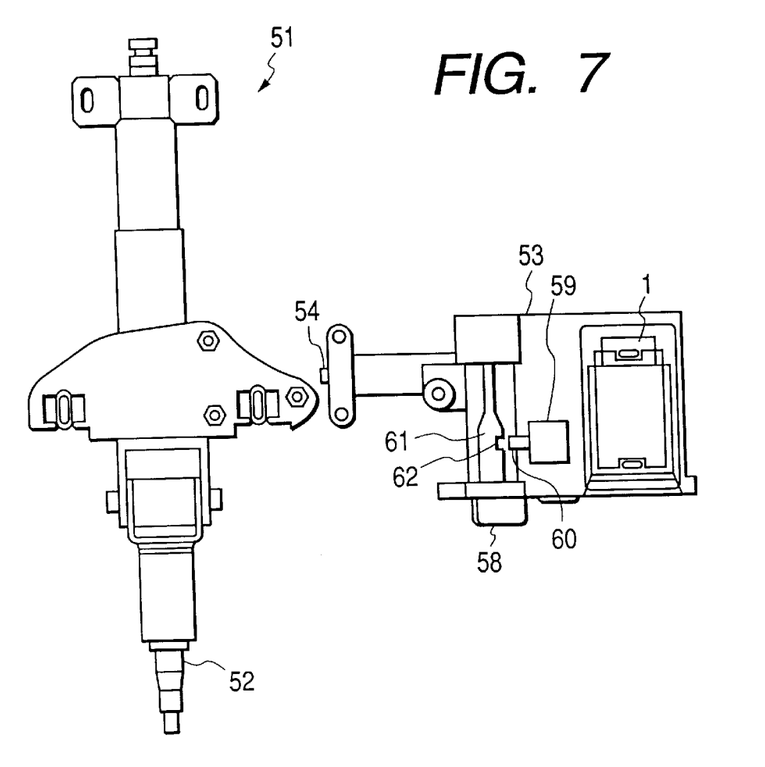
FIG. 7 is a structural view showing the outline of a steering lock apparatus used for the key entry system according to the present invention.

FIG. 7 schematically shows the external structure of a steering lock apparatus 51. As shown in the drawing, a lock (not shown) is formed in a part of a rod-shaped steering shaft 52. A lock bar 54 provided on a steering lock apparatus body 53 moves, and the leading end of the lock bar fits into a hole formed in the lock, thereby locking the steering shaft. When the leading end of the lock bar 54 is disengaged from the hole, the steering shaft is released from a locked state (i.e., unlocked).

Figure 8:
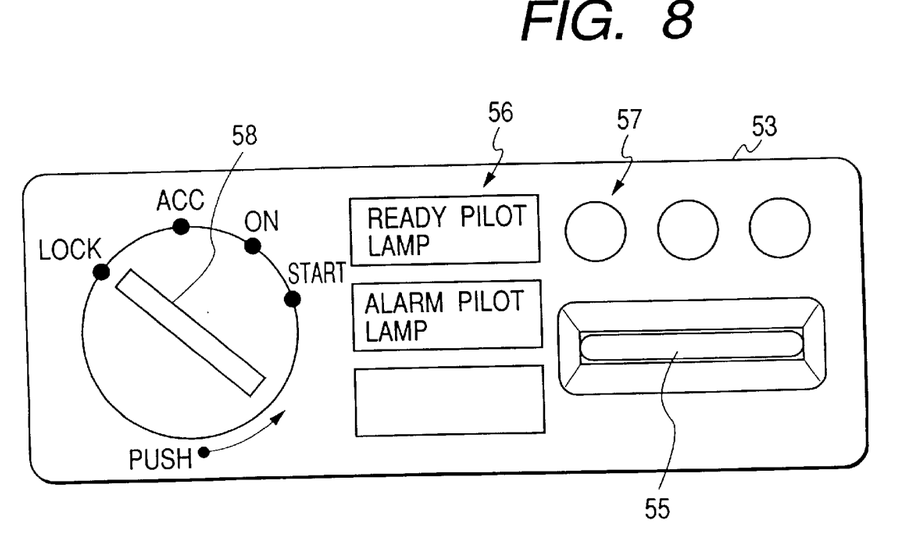
FIG. 8 is a front view showing the steering lock apparatus body shown in FIG. 7.

As shown in FIG. 8, the front side of the steering lock apparatus body 53 comprises an IC card insert slot 55 for receiving the IC card 1; a group of pilot lamps 56 including an alarm pilot lamp and a ready pilot lamp, which are illuminated when there is not any match between the ID code read from the IC card 1 and the ID code registered in the vehicle; memory switches 57; and an ignition dial 58 which is switched to a LOCK position, an ACC position, an ON position, and a START position in this order when turned clockwise.

As shown in FIG. 7, an ignition lock module 59 is provided in the steering lock apparatus body 53. This ignition lock module 59 has a lock shaft 60 which is capable of reciprocating. When the leading end of the lock shaft 60 is kept out of engagement with a lock notch 62 formed in the shaft 61 of the ignition dial 58, the ignition dial 58 can rotate. In contrast, when the leading end of the lock shaft 60 is kept in engagement with the lock notch 62, the ignition dial 58 cannot rotate. When there is a match between the ID code read from the inserted IC card 1 and the registered ID code as a result of comparison between the ID codes, the leading end of the lock shaft 60 is disengaged from the lock notch 62, thereby permitting the rotation of the ignition dial 58. In contrast, if there is not any match between the ID codes, the leading end of the lock shaft 60 is kept in engagement with the lock notch 62, thereby disabling the rotation of the ignition dial 58. If the ignition dial 58 is returned to the LOCK position after the engine has been shut down, the leading end of the lock shaft 60 is fit into the lock notch 62, thereby locking the ignition dial 58. The driver's seat indoor antenna 34 shown in FIG. 2 is provided within the steering lock apparatus body 53.

The operation of the steering lock apparatus will now be described. First, when the driver seats himself in the driver's seat and inserts the IC card 1 into the IC card insert slot 55, the control circuit 32 shown in FIG. 2 outputs a transmission instruction to the power supply switching circuit 43 in response to the inserting action. Upon reception of the transmission instruction, the power supply switching circuit 43 activates the transmission circuit 39, thereby producing a high-frequency electromagnetic field from the driver's seat indoor antenna 34. Upon reception of the high-frequency electromagnetic field thus produced from the driver's seat indoor antenna 34, the antenna coil 15 causes electromagnetic induction, thereby producing a.c. power.

The rectification/power supply circuit 19 rectifies and converts the a.c. power into d.c. power, the d.c. power being used as operating power for activating the electromagnetic induction power supply/transmission circuit 20.

The control circuit 16 is activated by the operating power and reads the contents of the ID memory 9. A data signal having a frequency corresponding to the thus-read contents is delivered to the modulation circuit 17. On the basis of the modulated data signal, the modulation circuit 17 transmits a code signal by way of the antenna coil 15. The thus-transmitted code signal is received by the receiving circuit 40 by way of the driver's seat indoor antenna 34 and is demodulated by the demodulation circuit 41. The thus-demodulated code signal is supplied to the comparison determination section 29, where the modulated code signal is compared with the ID code registered in the vehicle controller.

If there is a match between the ID codes as a result of such comparison, the control circuit 32 outputs an unlock instruction to the ignition lock module 59. In response to the unlock instruction, the ignition lock module 58 activates a solenoid to move the lock shaft 60 inserted into the lock notch 62 in the rightward direction in the drawing, thus unlocking the shaft 61. Associated with the unlocking action of the shaft 61, the steering lock is also unlocked, disengaging the leading end of the lock bar 54 from the hole. As a result, the steering shaft 52 becomes able to rotate.

In this state, the ignition dial 58 is actuated to the START position, whereby an engine start instruction is output, and the engine is started.

In a case where the vehicle is at a standstill, when the ignition dial 58 is rotated counterclockwise to the LOCK position while remaining in a pushed state, the engine is shut down, and the control circuit 32 outputs an ignition lock instruction to the ignition lock module 59. In response to the lock instruction, the ignition lock module 59 actuates the solenoid to move the lock shaft 60 in the leftward direction in the drawing until the leading end of the lock shaft 60 fits into the lock notch 62, thereby locking the shaft 61. Associated with the locking action of the shaft 61, the leading end of the lock bar 54 is fit into the hole, thereby locking the steering and disabling the rotation of the steering shaft 52.

According to the foregoing embodiment, the door lock is locked or unlocked by means of an FM signal through the FM modems. Further, with regard to the controlling of the steering lock and the ignition operation, power supply and transmission of an ID code are carried out through the electromagnetic induction occurred between the IC card I inserted into the steering lock apparatus body 53 and the vehicle controller 21. As a result, even if the holder of the IC card 1 is in a position spaced away from the vehicle or if the IC card 1 is kept in a pocket or bag, the door lock can be correctly and readily locked or unlocked. Further, in a case where the positional relationship between the IC card 1 and a card reader is fixed, the battery 14 provided in the IC card 1 is prevented from being wasted by controlling the door lock through electromagnetic induction originally used for locking or unlocking the door lock. In the event the battery 14 of the IC card 1 is dissipated, the door lock can be locked or unlocked through ordinary electromagnetic induction, thereby eliminating the need for the awareness of dissipation of the battery and resulting in a remarkable improvement in the convenience of the key entry system.

Although the foregoing embodiment has been conceived, in terms of convenience and cost, upon the example in which the door lock is controlled by means of an FM signal through FM-scheme modems which are resistance to noise and are not affected by a shielding substance other than metal, the present invention is not limited to this example. Various modems such as AM-scheme modems, PM-scheme modems, or Infrared modems may be used for the present invention.

As has been described above, according to the present invention, since a door lock is locked or unlocked by means of an FM signal through FM modems, correct controlling of the door lock becomes possible irrespective of the state in which an IC card is held. Further, since transmission of ID code data, which is originally carried out through electromagnetic induction, is also feasible, the reliability of key entry system is improved.

What is claimed is:

1. A key entry system comprising:
    an IC card including:
        a memory for storing an ID code, and
        an electromagnetic induction power supply/transmission circuit which receives power and which transmits the ID code to or receives the ID code from a vehicle controller by means of electromagnetic induction occurring between the circuit and the vehicle controller; and
    the vehicle controller including
        a memory for storing an ID code,
        a code checking section which checks the ID code stored in the memory of the vehicle controller against the ID code received from the IC card, and
        an electromagnetic induction power supply/reception circuit which supplies power to the IC card and which transmits data to and receives data from the IC card by means of electromagnetic induction,
    wherein the IC card further comprises an RF (radio frequency) modem for transmitting and receiving the data including the ID codes through a radio signal, and
    wherein the vehicle controller further comprises an RF modem for transmitting and receiving the data including the ID codes through a radio signal and
    wherein the transmitting and receiving via the RF modem is independent of the transmitting and receiving via the electromagnetic induction power supply reception circuits.

2. A key entry system as claimed in claim 1, wherein the RF modem of the IC card is an FM modem and the RF modem of the vehicle controller is an FM modem.

3. A key entry system as claimed in claim 1, wherein the IC card further comprises a battery for supplying d.c. power.

4. A steering lock apparatus, comprising:
    an IC card;
    a vehicle controller;
    a steering shaft; and
    a steering lock apparatus body for locking the steering shaft, the steering lock apparatus body including an IC card insert slot into which the IC card is inserted;
    wherein the IC card comprises:
        a memory for storing an ID code;
        an electromagnetic induction power supply/transmission circuit which receives power and which transmits the ID code to or receives the ID code from a vehicle controller by means of electromagnetic induction occurring between the circuit and the vehicle controller; and
        an RF modem for transmitting and receiving the data including the ID codes through a radio signal, and
    wherein the vehicle controller comprises:
        a memory for storing an ID code;
        a code checking section which checks the ID code stored in the memory of the vehicle controller against the ID code received from the IC card;
        an electromagnetic induction power supply/reception circuit which supplies power to the IC card and which transmits data to and receives data from the IC card by means of electromagnetic induction; and
        an RF modem for transmitting and receiving the data including the ID codes through a radio signal.

* * * * *